United States Patent
Taylor et al.

(10) Patent No.: US 6,167,979 B1
(45) Date of Patent: Jan. 2, 2001

(54) DYNAMIC SPEED GOVERNING OF A VEHICLE

(75) Inventors: Dennis O. Taylor; G. George Zhu, both of Columbus, IN (US)

(73) Assignee: Cummins Engine Company, Inc., Columbus, IN (US)

(*) Notice: Under 35 U.S.C. 154(b), the term of this patent shall be extended for 0 days.

(21) Appl. No.: 09/087,054

(22) Filed: May 20, 1998

(51) Int. Cl.[7] .................................................. B60K 31/00
(52) U.S. Cl. ........................ 180/170; 180/179; 123/357; 60/431
(58) Field of Search ..................... 180/170, 171, 180/172, 173, 174, 175, 176, 177, 178, 179; 701/93; 123/352, 360, 350, 351, 357; 60/431

(56) References Cited

U.S. PATENT DOCUMENTS

| | | | |
|---|---|---|---|
| 4,250,854 | 2/1981 | Matsui et al. | 234/352 |
| 4,286,685 | 9/1981 | Rudolph et al. | 180/176 |
| 4,352,403 | 10/1982 | Burney | 180/176 |
| 4,374,422 | 2/1983 | O'Keefe, Jr. et al. | 364/426 |
| 4,401,075 | 8/1983 | O'Keefe, Jr. et al. | 123/352 |
| 4,419,729 | 12/1983 | Krieder | 364/426 |
| 4,431,077 | 2/1984 | Burney | 180/176 |
| 4,513,836 | 4/1985 | Treadwell | 180/177 |
| 4,787,352 | 11/1988 | Anderson | 123/352 |
| 4,849,892 | 7/1989 | McCombie | 364/426.04 |
| 4,860,210 | 8/1989 | McCombie | 364/426.04 |
| 4,875,448 | 10/1989 | Dykstra | 123/352 |
| 4,881,404 | 11/1989 | Siegl | 73/119 A |
| 5,113,821 | 5/1992 | Fukui et al. | 123/335 |
| 5,177,683 | 1/1993 | Oo et al. | 364/462.04 |
| 5,268,842 | 12/1993 | Marston et al. | 364/431.05 |
| 5,303,163 | 4/1994 | Ebaugh et al. | 364/550 |
| 5,392,215 | 2/1995 | Morita | 364/462.04 |
| 5,483,927 | 1/1996 | Letang et al. | 123/41.12 |
| 5,553,589 | 9/1996 | Middleton et al. | 123/352 |
| 5,605,130 | 2/1997 | Dykstra et al. | 123/361 |
| 5,609,546 * | 3/1997 | Torii et al. | 477/108 |
| 5,623,408 * | 4/1997 | Motamedi et al. | 701/51 |
| 5,625,558 | 4/1997 | Togai et al. | 364/426.041 |
| 5,646,851 * | 7/1997 | O'Connell et al. | 701/93 |
| 5,961,566 * | 10/1999 | Heslop | 701/93 |

* cited by examiner

Primary Examiner—Brian L. Johnson
Assistant Examiner—Bidget Avery
(74) Attorney, Agent, or Firm—Woodard, Emhardt, Naughton, Moriarty & McNett

(57) ABSTRACT

A vehicle that has a drive train with an internal combustion engine, a transmission, and a number of ground engaging wheels. An operator-adjustable throttle control is monitored to provide a position signal corresponding to position of the throttle control. A sensor provides an observed speed signal corresponding to speed of the vehicle and a controller responds to the position signal and the observed speed signal to generate a target speed signal and an error signal. The target speed signal corresponds to a desired speed of the vehicle and is generated from a predetermined relationship between vehicle speed and throttle control position in accordance with the position signal. The error signal corresponds to a difference between the target speed signal and observed speed signal. The engine responds to the error signal to provide the desired vehicle speed for all operating speeds of the vehicle including a stopped or idle condition.

36 Claims, 3 Drawing Sheets

DYNAMIC SPEED GOVERNING OF A VEHICLE

BACKGROUND OF THE INVENTION

The present invention relates to speed governing techniques for vehicles powered by an internal combustion engine.

In recent years, the implementation of computerized control systems has improved the performance of vehicles powered by an internal combustion engine. Nonetheless, one persistent limitation of these control systems has been the ability to respond smoothly to changes in operating speed under certain conditions. For example, a smooth response for heavy vehicles, such as buses and trucks, is difficult to obtain because this type of vehicle tends to be underpowered and typically lacks the capability to accelerate quickly in response to speed changing conditions as compared to passenger cars. One reason for this difference is because the horsepower/mass ratio for heavy vehicles is generally different than passenger cars; and therefore, heavy vehicle control techniques must compensate for this difference. Additionally, the horsepower/mass ratios for heavy vehicles may vary over a wide range due to wide load variations. Still further, the number of gears in a heavy vehicle varies considerably compared to most passenger vehicles. For these reasons, heavy vehicle control systems are generally more sophisticated than for automobiles.

Also, for heavy vehicles which are equipped with diesel-fueled engines, the heavy vehicle control system typically must cooperate with a fuel control of the particular engine as well as a throttle control, unlike most passenger cars. The fuel control of a diesel engine is typically one or two types of governors: (1) a torque-based governor or (2) an all-speed governor.

A torque governor is configured so that the position of the throttle control generally corresponds to a given level of engine torque. For this type of governor, maintenance of a constant vehicle speed typically requires adjustment of the throttle position in response to variations in the incline and decline of the road. For diesel truck engines, this type of throttle governing configuration is sometimes referred to as a "min-max" governor because it typically limits both the minimum and maximum engine speed but does not directly regulate the engine speed between these limits.

In contrast, an all-speed governor regulates engine speed throughout a continuous engine speed range. This type of governor is commonly used in truck engines, where the throttle position is directly equated to engine speed rather than engine torque. One variety of "all-speed" governor is known as an "isochronous" governor. For the isochronous governor, a constant engine speed is provided for a constant throttle position, regardless of load. A strictly isochronous all-speed governor is not normally used for on-highway applications because small changes in throttle position correspond to large changes in engine torque, making it difficult to operate a vehicle smoothly. As a result, all-speed governors are typically modified to include a "droop" which permits a steady state engine speed to slightly decrease as engine load increases. Nonetheless, if the throttle position is moved too quickly the all-speed governor will constantly counteract the action and hunt to bring the system back into equilibrium. U.S. Pat. No. 5,553,589 to Middleton et al. provides further information concerning these types of governing arrangements.

While the all-speed governor is generally preferred as a more dynamic and responsive regulator, it also tends to have certain drawbacks. For example, it can be difficult to automatically maintain a desired vehicle speed with an all-speed governor. Also, the all-speed governor behaves undesirably when combined with certain types of nonmanual transmissions. These drawbacks are generally due to the fact that the vehicle speed error is a function of the engine speed error, to which the all-speed governor responds, and transmission gear ratio. Smooth vehicle speed is difficult to maintain due to gear shifting because the relationship between vehicle speed and engine speed changes as gears are shifted. Therefore, there is a need for a speed governing technique that better accommodates nonmanual transmissions—especially for heavy vehicles equipped with diesel-fueled engines. The present invention satisfies these needs and provides other important benefits and advantages.

SUMMARY OF THE INVENTION

The invention relates to governing techniques for vehicles powered by an internal combustion engine. Various aspects of the invention are novel, nonobvious, and provide various advantages. While the actual nature of the invention covered herein can only be determined with reference to the claims appended hereto, certain features which are characteristic of the preferred embodiment disclosed herein are described briefly as follows.

One feature of the present invention is a speed control technique which adjusts an engine powering the vehicle in accordance with a difference between an operator-selected vehicle speed and detected vehicle speed. This technique may include determining the operator-selected vehicle speed from a relationship or schedule characterizing a throttle control setting in terms of a range of desired vehicle speeds. This technique is particularly well suited to heavy-duty vehicles equipped with diesel-fueled engines and non-manual transmissions to maintain a constant vehicle speed for a given throttle position. As used herein, a "nonmanual transmission" includes any type of transmission which does not require an operator to manually shift between each available gear. Examples of nonmanual transmissions include a fully automatic transmission and a semi-automatic transmission, such as shift-by-wire transmission. One type of shift-by-wire transmission is provided by Eaton Corporation under the Trademark AUTOSHIFT. The techniques of the present invention may also be utilized in vehicles having a manual transmission.

Another feature of the present invention includes operating a vehicle having an operator-adjustable control to select vehicle speed. The control is kept in a selected position by maintaining a bearing contact therewith. A desired speed of the vehicle is determined from a predetermined schedule relating a vehicle speed range to a control position range. An observed speed of the vehicle is detected and operation of the vehicle is adjusted to provide the desired vehicle speed in accordance with a difference between the observed speed and the desired speed. This feature may further include repositioning the control to another position while maintaining the bearing contact to provide another vehicle speed.

An additional feature of the present invention includes a drive train configured to propel a vehicle that has an internal combustion engine and a number of ground engaging wheels. A means for governing operation of the engine as a function of vehicle speed is provided which is responsive to a change in setting of an operator-adjustable throttle control to determine a desired vehicle speed from a predetermined schedule relating throttle setting to vehicle speed. This means adjusts the engine to provide the desired vehicle speed in accordance with a difference of the desired vehicle speed from a detected vehicle speed. The means is operable to govern the engine at all operating speeds of the vehicle including when the vehicle is stopped with the engine running.

Still another feature includes operating a vehicle with an internal combustion engine. The vehicle has an operator compartment providing access to an operator-adjustable throttle control for the engine. Position of this control is monitored to provide a corresponding throttle signal. A filter is applied to the throttle signal to reduce vibration-induced variation. The filter includes a predetermined deadband range to provide a filtered signal that remains generally constant until the throttle signal meets a deadband limit. A desired vehicle speed is determined from the filtered signal and an observed vehicle speed is detected. The desired vehicle speed is compared to the observed vehicle speed to provide a vehicle speed error, and the engine is fueled as a function of the error to provide the desired vehicle speed.

In a further feature, a vehicle is operated that has an engine with an operator-adjustable control to select vehicle speed. A position of the control is selected and a nonzero speed of the vehicle is determined from this position in accordance with a predetermined schedule relating a vehicle speed range to a control position range. An observed vehicle speed is sensed and engine operation is governed as a function of a difference between the nonzero vehicle speed and the observed vehicle speed. This governing technique is operable to accelerate the vehicle from a stopped condition to the nonzero vehicle speed when the observed vehicle speed is zero.

In yet another feature, a vehicle includes a drive train having an internal combustion engine, a transmission, and a number of ground engaging wheels. The transmission is coupled to the internal combustion engine to turn the wheels to propel the vehicle. This feature further includes an operator-adjustable control to select vehicle speed. The control is monitored to provide a corresponding control setting signal. A sensor provides an observed speed signal corresponding to a measured speed of the vehicle. A controller responds to the setting signal and observed speed signal to generate a target speed signal from the setting signal by reference to a predetermined schedule relating vehicle speed to control setting. The target speed signal corresponds to a desired vehicle speed. An error signal is also generated that corresponds to a difference between the target speed signal and the desired vehicle speed signal. The engine responds to the error signal to provide the desired vehicle speed and the controller is operable to regulate the engine in accordance with the error signal for any operating speed of the vehicle.

Accordingly, one object of the present invention is to provide a speed governing technique for vehicles.

Another object is to provide a speed governing technique for heavy-duty vehicles having a nonmanual transmission, which smooths engine response when shifting between gears.

Still another object of the present invention is to provide a speed governor responsive to an operator adjustable throttle control that is operable to accelerate a vehicle from a stopped condition and to govern engine operation for any operating speed of the vehicle including when the vehicle is in a stopped condition with the engine running. This control may be of the type requiring a bearing contact to maintain certain selected positions.

Yet another object is to provide an apparatus and method for improving speed governors used with heavy vehicles having a shift-by-wire transmission.

Further objects, features, aspects, benefits, and advantages will become apparent from the drawings and description contained herein.

DESCRIPTION OF THE PREFERRED EMBODIMENT

Figure 1:
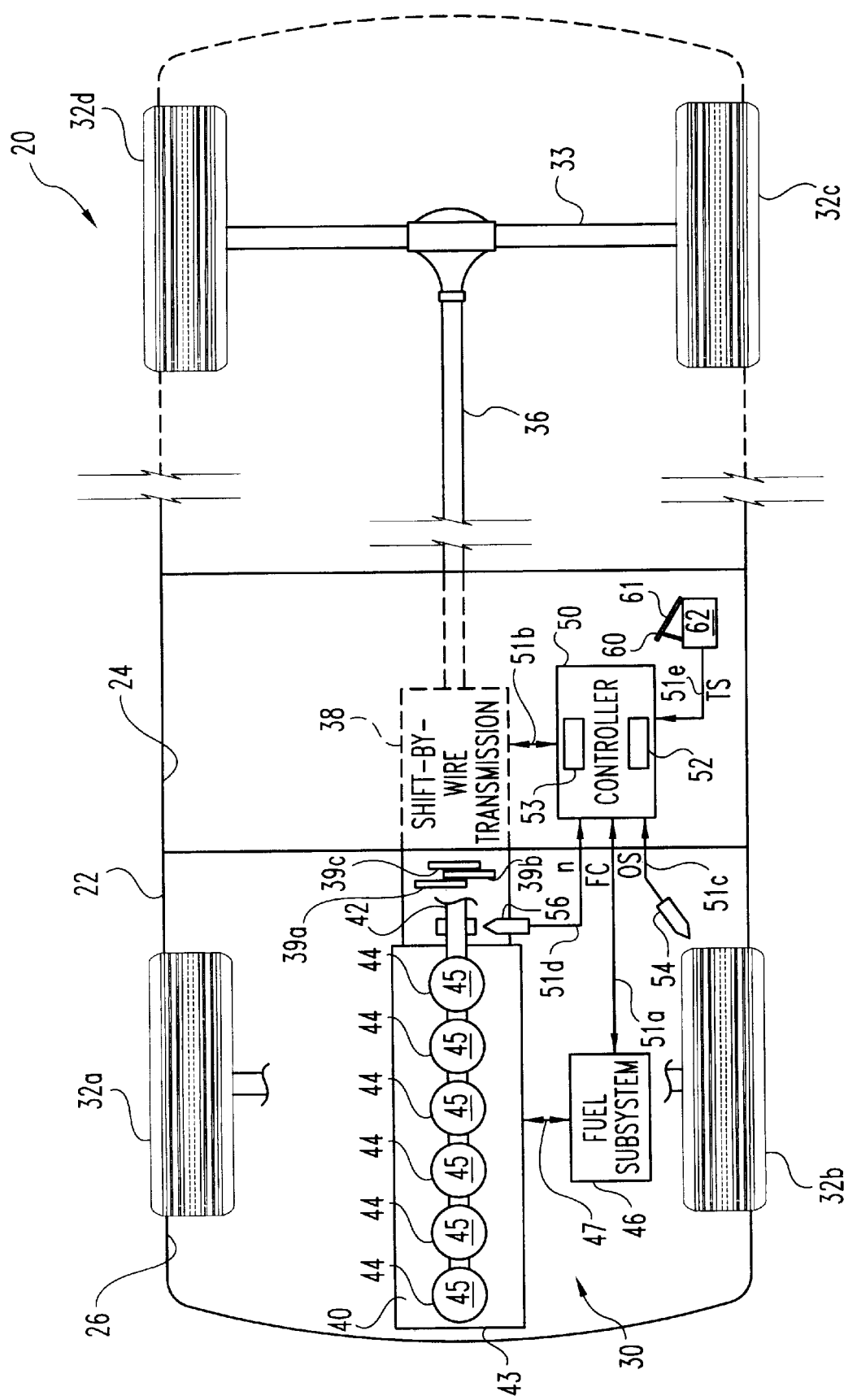
FIG. 1 is a schematic view of a vehicle of one embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described device, and any further applications of the principles of the invention as described herein are contemplated as would normally occur to one skilled in the art to which the invention relates.

FIG. 1 depicts vehicle 20 of one embodiment of the present invention. Vehicle 20 includes a vehicle chassis/body 22 defining an operator compartment 24 and an engine compartment 26. Preferably, vehicle 20 is a truck, bus, or other type of heavy-duty transport vehicle; however, in other embodiments, vehicle 20 may be of the light-duty variety, medium-duty variety, or such other variety as would occur to those skilled in the art.

Vehicle 20 also includes drive train 30. Drive train 30 includes ground engaging wheels 32a, 32b, 32c, and 32d (collectively designated wheels 32). Wheels 32c and 32d are rotatably coupled to axle 33. Axle 33 is rotatably coupled to shaft 36 of drive train 30. Shaft 36 is coupled to transmission 38 which is depicted as the shift-by-wire type. Transmission 38 includes a number of gears, a few which are designated by reference numerals 39a, 39b, and 39c. Preferably, transmission 38 is a ten speed AUTOSHIFT transmission provided by Eaton Corporation; however, other transmission types may be utilized as would occur to those skilled in the art including either manual or nonmanual varieties.

Internal combustion engine 40 of drive train 30 is coupled to transmission 38 via crankshaft 42. Engine 40 is the prime mover for drive train 30, providing the mechanical power to turn wheels 32c and 32d and correspondingly propel vehicle 20. Engine 40 includes engine block 43 defining a number of cylinders 44. Cylinders 44 each include a reciprocating piston 45 rotatably coupled to crankshaft 42 in the usual manner. It should be appreciated that engine 40 is schematically represented and that more or fewer cylinders 44 and corresponding pistons 45 may be employed as would occur to one skilled in the art. Preferably, engine 40 is of the four stroke diesel-fueled type with Compression Ignition (CI). In other embodiments, different types of engines or prime movers are envisioned as would occur to one skilled in the art. For example, alternative embodiments of internal combustion engine 40 may include Spark Ignition (SI) engines, engines with a different type of internal combustion process, engines fueled with one or more different types of fuel, and engines which employ rotors in place of pistons to name a few.

For the depicted embodiment, engine 40 is supplied fuel from fuel subsystem 46. Subsystem 46 is operatively coupled to engine 40 by pathway 47 which represents one Or more fuel lines, signal paths, or other type of engine connections common to a conventional fueling subsystem. Fuel subsystem 46 includes a fuel source such as a fuel tank (not shown), and controls the delivery of fuel for combustion in engine 40. Preferably, engine 40 is configured for direct-injection fueling, and subsystem 46 includes electronically controlled fuel injectors. In other embodiments, fuel may be mixed with air upstream of the intake manifold, port-injected, or provided through such other techniques as would occur to those skilled in the art.

Vehicle 20 also includes controller 50 operatively coupled to fuel subsystem 46 to provide one or more fuel command signals FC via signal path. 51a. Controller 50 includes memory 52 and processing unit 53. Controller 50 is preferably an electronic subsystem comprised of one or more components mounted on a common Engine Control Module (ECM) that is powered by a vehicle battery (not shown). However, for an embodiment of controller 50 including multiple components, these components may be distributed to different locations. Controller 50 may include digital circuitry, analog circuitry, or both.

Preferably, memory 52 is of the solid-state electronic variety, and may be embodied in one or more components. Memory 52 may alternatively or additionally be of the magnetic variety, optical variety, or such other variety as would occur to those skilled in the art. Further, memory 52 may be volatile, nonvolatile, or a combination of both volatile and nonvolatile types. In addition, while it is preferred that memory 52 be integrally included in a common ECM, it may also be remotely distributed for access via a communication link.

Processing unit 53 is configured to access memory 52 and is preferably mounted on a common ECM therewith. Preferably, processing unit 53 is a programmable, microprocessor-based device that executes instructions stored in memory 52, and accesses memory 52 to read or write data in accordance with these instructions. Processing unit 53 may alternatively be implemented as a dedicated state machine, or a hybrid combination of programmable and dedicated hardware.

Besides memory 52 and processing unit 53, controller 50 also includes any control clocks, interfaces, signal conditioners, filters, Analog-to-Digital (A/D) converters, Digital-to-Analog (D/A) converters, communication ports, or other types of operators as would occur to those skilled in the art to implement the principles of the present invention. Such operators may be provided as part of a common component or through one or more separate components. In addition to fuel subsystem 46, controller 50 is also operatively coupled to transmission 38 to exchange relevant signals via signal path 51b. Such signals may include data relative to gear-shift status, vehicle speed, and the currently engaged gear number. In one embodiment, controller 50 includes a separate microprocessor dedicated to the management of transmission 38. In still other embodiments, there may be no need to provide for the transmission of signals between transmission 38 and controller 50 or a corresponding connection.

Controller 50 is also operatively coupled to vehicle speed sensor 54 via signal path 51c. Vehicle speed sensor 54 provides an observed vehicle speed signal OS corresponding to the travel speed of vehicle 20. Vehicle speed sensor 54 may provide signal OS by monitoring the rate of revolution of one or more tires or wheels 32 in contact with the road, by interfacing to a pre-existing speedometer arrangement (not shown), or through such other techniques as are known to those skilled in the art. In one alternative embodiment, vehicle speed is determined from data sent over signal path 51b from transmission 38 that corresponds to rotational speed of shaft 36. For this embodiment, the vehicle speed is calculated from a known relationship between the rotation of shaft 36 and the tire or wheel size of vehicle 20.

Controller 50 is also coupled to engine speed sensor 56 which provides a signal corresponding to rotational speed of engine 40 on signal path 51d. Preferably, sensor 56 is a known Hall effect device operable to sense speed and/or position of a toothed gear rotating synchronously with crankshaft 42. However, the present invention contemplates using any known engine speed sensor type, such as the variable reluctance type, which is operable to sense engine rotational speed. Sensor 56 provides signal "n" to controller 50 which corresponds to engine speed.

Vehicle 20 operator compartment 24 includes operator adjustable throttle control 60. Throttle control 60 includes a common accelerator pedal 61. Throttle control 60 is monitored by throttle setting detector 62 to report a throttle setting as signal TS. Signal TS represents a positional range of pedal 61 from 0% at one extreme to 100% at the other extreme. Throttle setting signal TS is provided to controller 50 along signal path 51e which operatively couples throttle control 60 to controller 50.

In one embodiment, accelerator pedal 61 is biased to an undeflected position that corresponds to the 0% extreme. Likewise, this undeflected position corresponds to a minimum speed of vehicle 20 such as a negative vehicle speed or a stopped condition of vehicle 20. By bearing against pedal 61, it may be deflected to occupy any position in the range greater than 0% up to a maximum deflection which corresponds to the 100% extreme. This maximum deflection position corresponds to a maximum operator selectable speed of vehicle 20. Thus, the 0% to 100% positional range corresponds to the full range of operating speeds of vehicle 20. Preferably, a deflected position is maintained against the bias of pedal 61 through bearing contact by an operator's foot to select a nonzero speed greater than a minimum speed for the undeflected position (which may be zero). Consequently, an operator may dynamically command different speeds by changing the deflected position of pedal 61 or letting pedal 61 return to the undeflected position. Throttle control 60 provides the operator the ability to dynamically accelerate vehicle 20 from a stopped condition or slower nonzero speed by increasing the degree of deflection, and to correspondingly decelerate vehicle 20 to a stopped condition or slower nonzero speed by decreasing the degree of deflection.

For this embodiment, it is preferred that detector 62 include a potentiometer having a predetermined D.C. voltage placed across its entire resistance. The potentiometer has a wiper that is mechanically linked to pedal 61. Through this linkage, the wiper moves in response to deflection of pedal 61 to vary its point of contact along the potentiometer resistance, providing a variable voltage divider. Accordingly, a voltage proportional to the position of pedal 61 may be provided by tapping the wiper contact point that may then serve as signal TS. Preferably, signal TS is converted to digital form by controller 50 for subsequent processing therein. In an alternative embodiment, detector 62 includes a hall-effect device that is responsive to magnetic field changes caused by a toothed member that moves with pedal 61. In still other embodiments, detector 62 may be any type of suitable position sensor as would occur to those skilled in the art.

Also, other types of operator manipulated throttle controls are envisioned besides pedal 61, including, but not limited to, levers, dials, or plungers. These alternative devices may or may not require a generally continuous bearing contact to maintain certain selected positions.

Figure 2:
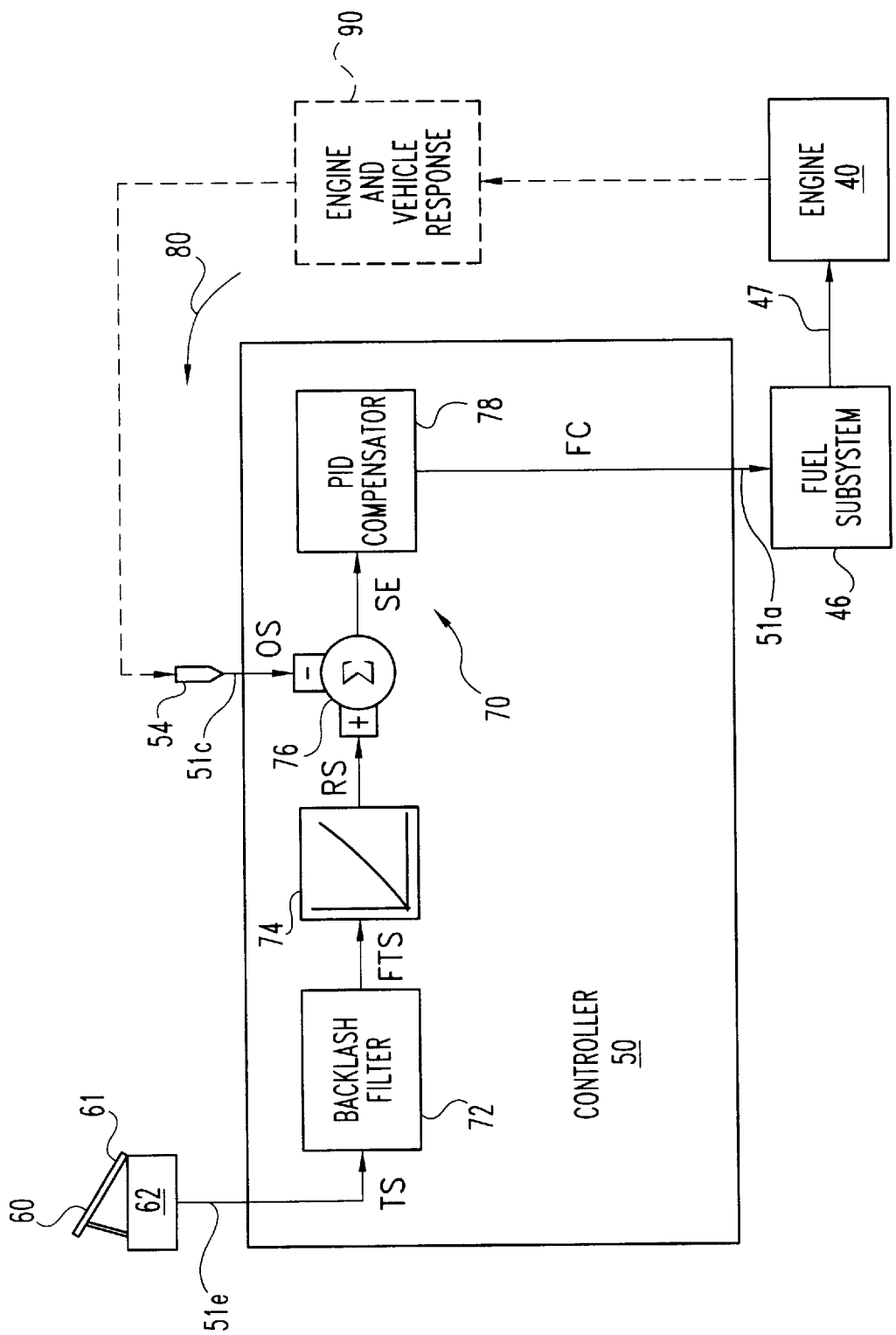
FIG. 2 is a schematic view of the speed control system for the vehicle of FIG. 1 including a signal flow diagram.

Referring to FIG. 2, further aspects of controller 50 are next described. Controller 50 is configured to implement vehicle speed governing system 70 symbolically depicted in FIG. 2. Controller 50 receives throttle setting signal TS from detector 62 which corresponds to a percentage value. Within controller 50, throttle setting signal TS enters backlash filter 72 of system 70. Backlash filter 72 is configured to remove variations in signal TS resulting from vibration and similar disturbances common to the driver compartment of most powered vehicles. This type of disturbance may be especially prominent in heavy-duty vehicles. The throttle signal setting is output by filter 72 as filtered signal FTS.

Figure 3A:
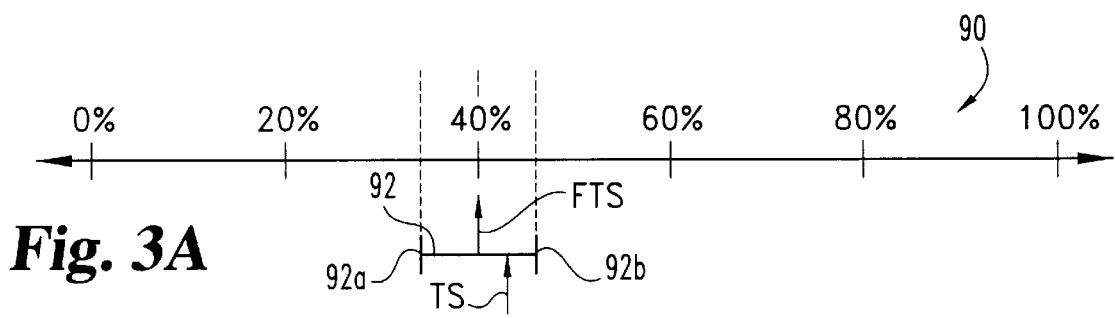
FIGS. 3A–3E are diagrammatic views of selected stages of operation of the backlash filter shown in FIG. 2.

Backlash filter 72 utilizes a sliding deadband that is insensitive to minor input variations of the type commonly resulting from cab vibration. Referencing additionally FIGS. 3A–3E, an example of the operation of filter 72 is provided. In FIG. 3A, scale 90 is representative of the range of the filtered output signal FTS which extends from 0% through 100%. Immediately below scale 90 is deadband range segment 92 that represents a sliding filter deadband having extremes or limits 92a and 92b. For the illustrated example, the deadband range has been exaggerated to enhance clarity; however, it is preferably about +/−1%. Other values of the deadband range may be selected as would occur to one skilled in the art. The current level of the input signal TS is represented by the arrow below segment 92 and the current level of the filtered signal FTS is represented by the arrow above segment 92. Notably, the arrow for signal FTS stays at a predetermined position relative to limits 92a and 92b. In the depicted example, this position is the midpoint between limits 92a and 92b. Correspondingly, the output signal level for signal FTS is generally in the center of the deadband range such that deadband range segment 92 extends equal amounts above and below signal FTS along scale 90.

In FIG. 3A, the level of the output signal is at about 40% and the level of signal TS is depicted within the deadband range, but is greater than the level of FTS. Nonetheless, as long as the signal level TS stays between the limits 92a and 92b, the output signal FTS of filter 74 remains in the same position (40%) relative to scale 90. Thus, the input signal TS may oscillate in correspondence with a vibratory disturbance in the deadband range represented by segment 92 without causing a change in the level of signal FTS.

Figure 3B:
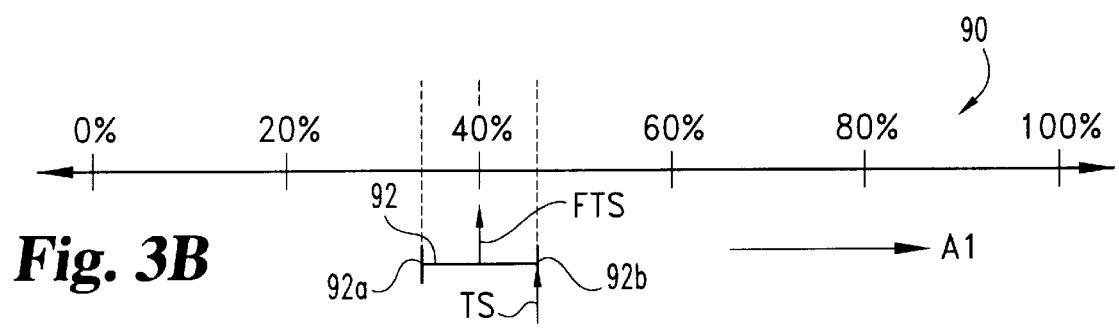
Figure 3C:
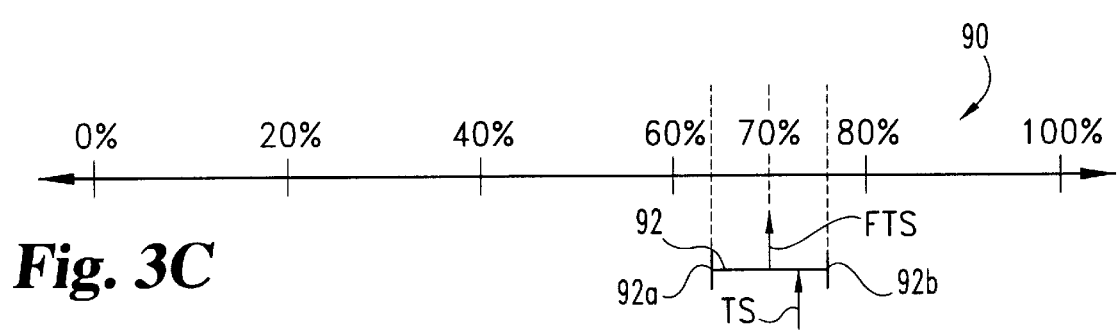

However, if the level of input signal TS reaches an extreme of the deadband range and continues to change in the direction of that extreme, the deadband range begins to slide relative to scale 90. In the example of FIG. 3B, signal TS has reached limit 92b and continues to increase in the direction of arrow A1, urging segment 92 to slide in the same direction. Segment 92 slides along arrow A1, increasing the level of signal FTS, until the level of signal TS decreases or FTS reaches 100%. In FIG. 3C, TS has decreased so that signal FTS is set at about 70% with an equal portion of the deadband range on either side. The deadband range remains in this new position relative to scale 90 until the level of signal TS once again reaches an extreme 92a or 92b, and continues to correspondingly decrease or increase.

Figure 3D:
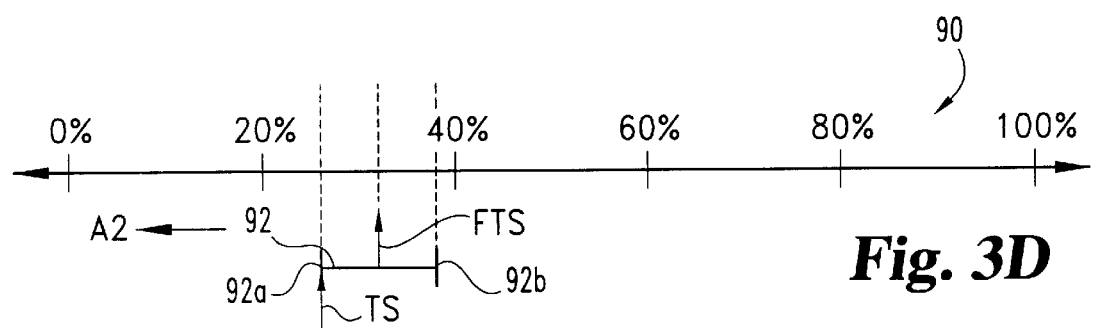
Figure 3E:
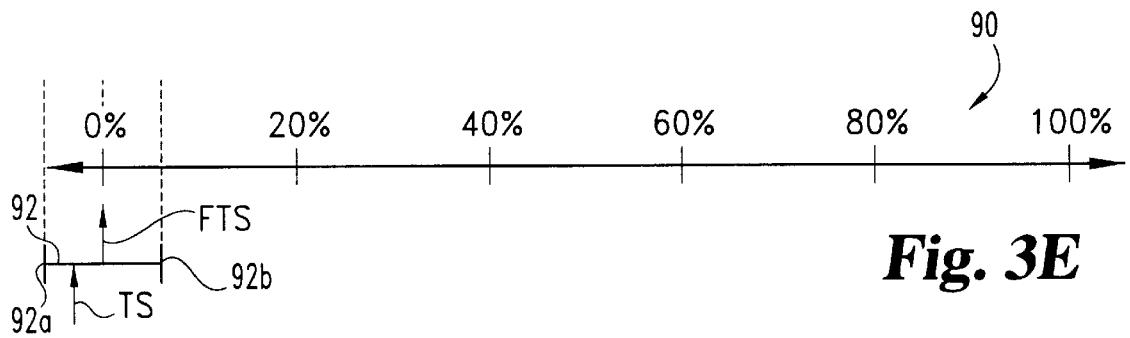

FIG. 3D, illustrates the situation when the input signal TS reaches the lower limit 92a. For this case, deadband segment 92 correspondingly moves once again; however, this time the direction of movement follows arrow A2 to decrease the level of output signal FTS. Signal FTS decreases as long as signal TS remains at the lower limit 92a or until signal FTS reaches 0%. In FIG. 3E, deadband segment 92 has moved until the level of output signal FTS reached 0%. For this position, the input signal TS may continue to vary without altering signal FTS until the level of signal TS reaches the upper limit 92b. Notably, scale 90 is normalized relative to the possible range of input levels of signal TS to assure that 0% through 100% range of signal FTS is available, despite the possibility of more extreme excursions by the input signal TS at the 0% and 100% margins.

Preferably, backlash filter 72 is implemented in programming executed by processing unit 53 of controller 50; however, other implementations may be utilized as would occur to those skilled in the art. Returning to FIG. 2, the filtered throttle control setting signal FTS is input into schedule 74. Schedule 74 corresponds to the relationship between throttle control setting or position and a desired vehicle speed. In other words, schedule 74 relates a range of desired or target vehicle speeds to the 0% to 100% position range of signal FTS. A reference vehicle speed, designated by signal RS, is output by schedule 74 that corresponds to the level of signal FTS received by schedule 74. Preferably, schedule 74 is provided as a look-up table within memory 52 that is accessed by processing unit 53 in response to receiving data corresponding to the level of signal FTS. Alternatively, schedule 74 may be implemented through one or more mathematical expressions characterizing the relationship of throttle setting versus desired vehicle speed, or another type of characterization, mapping, or relationship as would occur to those skilled in the art. Likewise, dedicated hardware may be used to provide the signal RS corresponding to the level of signal FTS distinct from the operation of processing unit 53.

The output of schedule 74, reference speed signal RS, is provided to a positive ("+") input of summing junction 76 where it is combined with a negative input ("−") The negative input receives the observed vehicle speed signal OS on signal path 51c from sensor 54. Consequently, summing junction 76 compares signals RS and OS to determine a difference therebetween. This difference is output by junction 76 as a vehicle speed error signal SE. Naturally, this comparison or difference between desired and observed vehicle speeds may alternatively be determined through a variety of operations including, for example, the determination of a ratio of these signals in lieu of a subtraction operation.

The output vehicle speed error signal SE of summing junction 76 is input into a Proportional+Integral+Derivative (PID) compensator 78. Generally, PID compensator 78 may be expressed in Laplace transform form by the following expression:

$$k = k_C(1 + t_D s + 1/t_I s);$$

where $k_C$=gain; $t_I$=the integral time constant; and $t_D$=the derivative time constant. PID compensator 78 is tuned to provide output k as the fueling command signal FC to engine 40.

The fueling command signal FC is output by controller 50 to fuel subsystem 46. Fuel subsystem 46 responds to signal FC, and ultimately signal SE, by adjusting fuel supplied to engine 40 along pathway 47 to correspondingly regulate the speed of vehicle 20 and achieve the desired vehicle speed. The response of vehicle 20 and engine 40 is symbolically represented by block 90 which in turn causes the observed speed signal OS detected by vehicle speed sensor 54 to change, closing feedback loop 80. Thus, system 70 provides a vehicle speed governing technique to regulate operation of engine 40 that includes closed-loop negative feedback. This approach varies from other operator-controlled engine governing techniques which rely on engine speed instead of vehicle speed as the primary feedback parameter. Moreover, by employing vehicle speed, the problems stemming from engine speed governing of vehicles with various nonmanual transmission types are solved.

Preferably, controller 50 is configured to provide the operations represented by the signal flow diagram shown within controller 50 in FIG. 2, including backlash filter 72, schedule 74, junction 76, and PID compensator 78. Nonetheless, in other embodiments, one or more of these operations may be separately implemented. Moreover, it is contemplated that a compensation scheme other than a FID compensator may be employed. Also, an engine operator adjustment other than a fueling command may be utilized to correct the speed error as represented by speed error signal SE. Further, in still other embodiments, a filter to reduce throttle control vibration effects may both be utilized.

Sensors and detectors 54, 56, 62 may provide a signal in either a digital or analog format compatible with associated equipment. Correspondingly, equipment coupled to each sensor is configured to condition and covert sensor signals to the appropriate format, as required. All sensors and detectors may be of a type known to those skilled in the art.

All publications, patents, and patent applications cited in this specification are herein Incorporated by reference as if each individual publication, patent, or patent application were specifically and individually indicated to be incorporated by reference and set forth in its entirety herein.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An apparatus comprising: a vehicle having a drive train with an internal combustion engine, a transmission and a number of ground engaging wheels, said transmission being coupled to said internal combustion engine to turn said wheels to propel said vehicle, said vehicle further including:
   an operator-adjustable control to select vehicle speed, said control being monitored to provide a corresponding control setting signal;
   a sensor providing an observed speed signal corresponding to a measured speed of said vehicle;
   a controller responsive to said setting signal and said observed speed signal to generate:
      a target speed signal from said setting signal by reference to a predetermined schedule relating vehicle speed to control setting, said target speed signal corresponding to a first vehicle speed,
      an error signal corresponding to a difference between said target speed signal and said observed speed signal; and
   wherein said engine responds to said error signal to provide said first vehicle speed and said controller is operable to regulate said engine in accordance with said error for any operating speed of said vehicle while said engine is running.

2. The apparatus of claim 1, wherein said any operating speed of said vehicle includes a stopped condition of said vehicle.

3. The apparatus of claim 1, wherein said engine responds to said error signal to accelerate said vehicle from a stopped condition to said first nonzero vehicle speed when said measured speed corresponds to said stopped condition.

4. The apparatus of claim 1, wherein said first vehicle speed corresponds to a first position of said control and said controller is configured to adjust said error signal in response to movement of said control to a second position to decelerate said vehicle to a second speed, said second speed being less than said first speed.

5. The apparatus of claim 1, wherein said transmission is a shift-by-wire type with a plurality of gears.

6. The apparatus of claim 1, wherein said vehicle further includes a fueling subsystem and said error signal corresponds to a fueling command to said fueling subsystem.

7. The apparatus of claim 1, wherein said control is responsive to generally continuous bearing contact to maintain a speed of said vehicle above a minimum amount.

8. The apparatus of claim 1, wherein said controller further includes a backlash filter to reduce vibration-induced noise of said setting signal.

9. The apparatus of claim 8, wherein:
   said transmission is a nonmanual shift-by-wire type with a plurality of gears;
   said vehicle further includes a fueling subsystem and said error signal corresponds to a fueling command to said fueling subsystem;
   said control includes an accelerator pedal responsive to continuous bearing contact to maintain a selected speed of said vehicle above a minimum amount; and
   said controller includes a digital memory operatively coupled thereto to store data corresponding to said schedule, and said controller includes a PID compensator to generate said fueling command from said error signal.

10. A method, comprising:
   operating a vehicle with an internal combustion engine, the vehicle defining an operator compartment providing access to an operator-adjustable throttle control for the engine;
   detecting position of the throttle control to provide a corresponding throttle signal to correspondingly increase and decrease speed of the vehicle in response to adjustment of the position;
   applying a filter to the throttle signal to reduce vibration-induced variation, the filter including a predetermined deadband to provide a filtered signal that remains generally constant until the throttle signal meets a deadband limit;
   determining a desired vehicle speed from the filtered signal;
   sensing observed vehicle speed;
   comparing the desired vehicle speed to the observed vehicle speed to provide a vehicle speed error; and
   fueling the engine as a function of the vehicle speed error to provide the desired vehicle speed.

11. The method of claim 10, further comprising bearing against said control to maintain a selected position of said control corresponding to said desired vehicle speed.

12. The method of claim 11, Wherein said control includes an accelerator pedal.

13. The method of claim 12, further comprising decreasing the desired vehicle speed by changing position of the pedal.

14. The method of claim 13, further comprising accelerating the vehicle from a stopped condition by bearing on the pedal.

15. The method of claim 14, wherein the vehicle includes a transmission operatively coupled to the engine and further comprising shifting between gears of the transmission while governing the engine in accordance with the vehicle speed error.

16. A method, comprising:
operating a vehicle having an engine with an operator-adjustable control to select vehicle speed;
selecting a first position of the control;
determining the first nonzero vehicle speed from the first position in accordance with a predetermined schedule relating a vehicle speed range to a control position range;
sensing observed vehicle speed; and
governing engine operation as a function of a difference between the first nonzero vehicle speed and the observed vehicle speed, said governing being operable to accelerate said vehicle from a stopped condition to the first nonzero vehicle speed when the observed vehicle speed is zero.

17. The method of claim 16, wherein said determining includes accessing data stored in a memory device, the data corresponding to the schedule.

18. The method of claim 16, further comprising repositioning the control to a second position, said second position corresponding to a second nonzero vehicle speed less than the first nonzero vehicle, said second position being maintained by bearing contact with the control.

19. The method of claim 16, wherein the control includes an accelerator pedal and said selecting includes deflecting the pedal.

20. The method of claim 16, wherein the engine is coupled to a nonmanual type of transmission and further comprising shifting between gears of the transmission during said governing.

21. A method, comprising:
operating a vehicle having an operator-adjustable control to select vehicle speed;
keeping the control in a first position by maintaining a bearing contact therewith;
determining a first desired speed of the vehicle corresponding to the selected position from a predetermined schedule relating a vehicle speed range to a control position range;
detecting a first observed speed of the vehicle;
adjusting operation of the vehicle to provide the first desired speed in accordance with a difference between the first observed speed and the first desired speed;
repositioning the control to a second position while maintaining the bearing contact with the control;
establishing a second desired speed of the vehicle corresponding to the second position from the schedule;
detecting a second observed speed of the vehicle; and
controlling operation of the vehicle to provide the second desired speed in accordance with a difference between the second observed speed and the second desired speed.

22. The method of claim 21, wherein said determining includes accessing data stored in a memory device, the data corresponding to the schedule.

23. The method of claim 21, wherein the first desired speed and the second desired speed are each greater than zero and the first desired speed is greater than the second desired speed.

24. The method of claim 21, wherein the control includes an accelerator pedal and the pedal is deflected by a first amount to provide the first position and a second amount to provide the second position.

25. The method of claim 21, wherein the first observed speed corresponds to a stopped position of the vehicle and said adjusting includes accelerating the vehicle from the first observed speed to the first desired speed in response to the difference between the first observed speed and the first desired speed.

26. An apparatus, comprising:
a drive train configured to propel a vehicle, said drive train having an internal combustion engine and a number of ground engaging wheels; and
a means for governing operation of said engine as a function of vehicle speed, said means being responsive to an operator-adjustable throttle control to determine a desired vehicle speed from a predetermined schedule relating throttle setting to vehicle speed, said means adjusting said engine to provide said desired vehicle speed in accordance with a difference of said desired vehicle speed from a detected vehicle speed, said means being operable to govern said engine at all operating speeds of said vehicle including when said vehicle is stopped with said engine running.

27. The apparatus of claim 26, wherein said means includes a PID compensator.

28. The apparatus of claim 26, wherein said drive train includes a shift-by-wire transmission with a plurality of gears.

29. The apparatus of claim 26, wherein said throttle control includes an accelerator pedal requiring generally continuous bearing contact to maintain a speed of said vehicle above a minimum amount.

30. The apparatus of claim 26, wherein said means includes a backlash filter to reduce vibration-induced noise of a signal provided by said control.

31. The apparatus of claim 26, further comprising a fueling subsystem responsive to said means.

32. The apparatus of claim 31, wherein:
said drive train includes a shift-by-wire transmission with a plurality of gears;
said throttle control includes an accelerator pedal requiring generally continuous bearing contact to maintain a selected speed of said vehicle above a minimum amount;
said means includes a digital memory to store data corresponding to said schedule said means further includes a backlash filter and a PID compensator responsive to a difference between said desired vehicle speed and said detected vehicle speed to generate a fueling command; and
said fueling subsystem responds to said fueling command to supply fuel to said engine to provide said desired vehicle speed.

33. The apparatus of claim 26, wherein said means governs said engine to accelerate said vehicle from a stopped condition to said desired vehicle speed when said detected vehicle speed corresponds to said stopped condition.

34. The apparatus of claim 26, wherein said means is operable to adjust said engine to provide said desired vehicle speed in response to a movement of said operator-adjustable throttle control from a first detected position of said operator-adjustable throttle control to a second detected position of said operator-adjustable throttle control, said first detected position being different from said second detected position, said desired vehicle speed corresponding to said second detected position.

35. The apparatus of claim 34, wherein said vehicle is accelerated as said means adjusts said engine to provide said desired vehicle speed in response to a movement of said operator-adjustable throttle control from said first detected position to said second detected position.

36. The apparatus of claim 34, wherein said vehicle is decelerated as said means adjusts said engine to provide said desired vehicle speed in response to a movement of said operator-adjustable throttle control from said first detected position to said second detected position.

* * * * *